(12) United States Patent
Yang et al.

(10) Patent No.: US 12,511,814 B2
(45) Date of Patent: Dec. 30, 2025

(54) VIRTUAL SCENE GENERATION METHOD, ELECTRONIC DEVICE AND STORAGE MEDIUM

(71) Applicant: HON HAI PRECISION INDUSTRY CO., LTD., New Taipei (TW)

(72) Inventors: Jung-Hao Yang, New Taipei (TW); Chin-Pin Kuo, New Taipei (TW); Chih-Te Lu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 265 days.

(21) Appl. No.: 18/215,241

(22) Filed: Jun. 28, 2023

(65) Prior Publication Data

US 2024/0273807 A1 Aug. 15, 2024

(30) Foreign Application Priority Data

Feb. 10, 2023 (CN) .......................... 202310109861.2

(51) Int. Cl.
| | |
|---|---|
| G06T 15/04 | (2011.01) |
| G06T 7/20 | (2017.01) |
| G06T 7/50 | (2017.01) |
| G06T 7/70 | (2017.01) |
| G06V 10/44 | (2022.01) |

(Continued)

(52) U.S. Cl.
CPC .............. *G06T 15/04* (2013.01); *G06T 7/20* (2013.01); *G06T 7/50* (2017.01); *G06T 7/70* (2017.01); *G06V 10/44* (2022.01); *G06V 10/46* (2022.01); *G06V 10/764* (2022.01); *G06V 2201/07* (2022.01)

(58) Field of Classification Search
CPC .. G06T 15/04; G06T 7/20; G06T 7/50; G06T 7/70; G06T 17/00; G06T 19/006; G06T 19/20; G06T 2210/61; G06V 10/44; G06V 10/46; G06V 10/764; G06V 2201/07; G06V 10/82; G06V 20/20
See application file for complete search history.

(56) References Cited

U.S. PATENT DOCUMENTS

| | | | |
|---|---|---|---|
| 2023/0153384 A1* | 5/2023 | Stenson | G06V 10/764 382/104 |
| 2024/0144591 A1* | 5/2024 | Piskunov | G06T 7/70 |

FOREIGN PATENT DOCUMENTS

| | | |
|---|---|---|
| CN | 112149545 | 12/2020 |
| CN | 112639846 | 4/2021 |

\* cited by examiner

*Primary Examiner* — Jin Cheng Wang
(74) *Attorney, Agent, or Firm* — ScienBiziP, P.C.

(57) ABSTRACT

A virtual scene generation method applied to an electronic device is provided. The electronic device identifies object prediction information of each real object in each of real scene images. A first virtual image corresponding to each real scene image is obtained according to the object prediction information of each real object. A second virtual image and a texture difference image corresponding to each real scene image are generated. A target image corresponding to each real scene image is generated according to the second virtual image and the texture difference image corresponding to each real scene image. Once a virtual scene generation model is generated based on the real scene images, the first virtual image, the second virtual image, the target image corresponding to each real scene image, a virtual scene corresponding to an image is obtained using the virtual scene generation model and the virtual scene simulator.

20 Claims, 3 Drawing Sheets

(51) Int. Cl.
*G06V 10/46* (2022.01)
*G06V 10/764* (2022.01)

VIRTUAL SCENE GENERATION METHOD, ELECTRONIC DEVICE AND STORAGE MEDIUM

FIELD

The present disclosure relates to the field of image processing technology, in particular to a virtual scene generation method, an electronic device, and a storage medium.

BACKGROUND

In the current virtual scene generation scheme, artificial intelligence is unable to learn the comprehensive information of the real object, resulting in insufficient perception of the real object, and resulting in a generation of a virtual scene being inaccurate.

DETAILED DESCRIPTION

Figure 1:
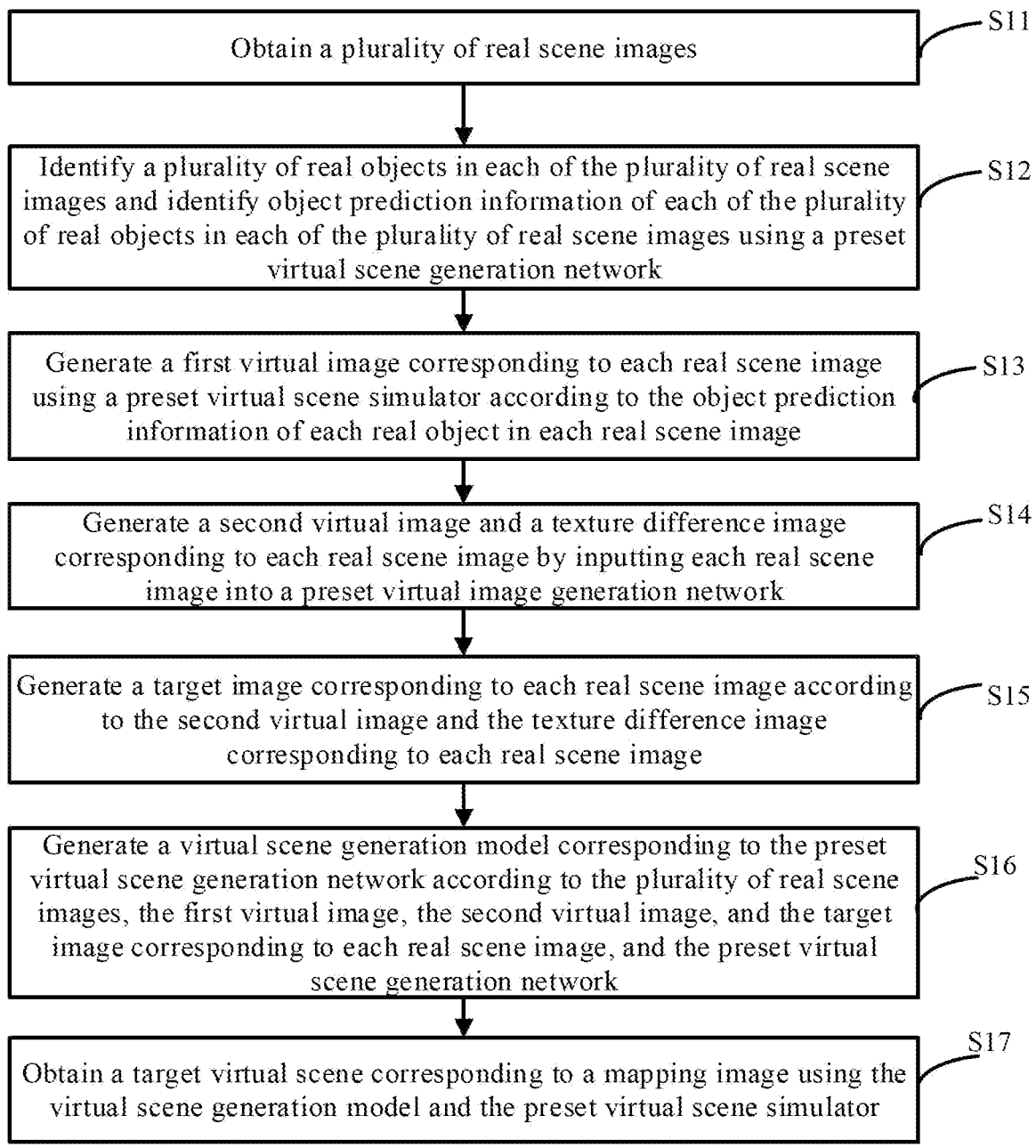
FIG. 1 is a flow chart of a virtual scene generation method provided by one embodiment of this application.

It should be noted that "at least one" in this application means one or more, and "a plurality of" means two or more than two. "And/or" describes the association relationship of the associated object, indicating that there can be three kinds of relations. For example, A and/or B can represent: A exists alone, A and B exist simultaneously, B exists alone, where A and B can be singular or plural. The terms "first", "second", "third", "fourth", etc., if any, in the specification and claims of this application and the accompanying drawings are used to distinguish between similar objects and not to describe a particular order or sequence.

In this application embodiment, the words "exemplary" or "for example" are used to mean to illustrate, exemplify or illustrate. Any embodiment or design described as "exemplary" or "for example" in this application shall not be construed as being preferable or superior to other embodiments or designs. Specifically, the use of words such as "exemplary" or "for example" is intended to present related concepts in a concrete way.

In order to provide a more clear understanding of the objects, features, and advantages of the present disclosure, the same are given with reference to the drawings and specific embodiments.

In the current virtual scene generation scheme, artificial intelligence is unable to learn the comprehensive information of the real object, resulting in insufficient perception of the real object, resulting in inaccurate generation of a virtual scene.

In order to solve the above technical problems, the embodiment of this application provides a virtual scene generation method, which can improve the accuracy of a generation of the virtual scene. It will be explained in detail in combination with the corresponding attached drawings below.

The virtual scene generation method provided by this application may be applied to one or more electronic devices (e.g., electronic device 1 shown in FIG. 3), which may be devices (e.g., computers, mobile phones, etc.) that communicate with a vehicle and are capable of controlling the vehicle, or the electronic devices may be vehicle-mounted devices built into the vehicle.

The electronic device 1 is a device that can automatically perform numerical calculation and/or information processing according to pre-set or stored instructions, and its hardware includes, but is not limited to, a microprocessor, an application specific integrated circuit (ASIC), a field-programmable gate array (FPGA), a digital signal processor (DSP), an embedded equipment, and so on.

The electronic device 1 can be any electronic product that can interact with a user. For example, the electronic device 1 can be a personal computer, a tablet computer, a smart phone, a personal digital assistant (PDA), a game console, and an internet protocol television (IPTV), a smart wearable device, etc.

The electronic device 1 may also include network equipment and/or user equipment. Wherein, the network device includes, but is not limited to, a network server, a server group formed by a plurality of network servers, or a cloud formed by a large number of hosts or network servers based on cloud computing.

The network where the electronic device 1 is located includes, but is not limited to, the Internet, a wide area network, a metropolitan area network, a local area network, a virtual private network (VPN), and the like.

FIG. 1 is a flowchart of one embodiment of the virtual scene generation method of the present disclosure. According to different requirements, a sequence of each block in this flowchart can be adjusted according to actual requirements, and some blocks can be omitted. The execution body of this method can be an electronic device, such as the electronic device 1 shown in FIG. 3.

S11, the electronic device obtains a plurality of images of real scenes (hereinafter referred to as "real scene images") captured by a capture device 12.

In at least one embodiment, the capture device 12 is a real physical capture device, the capture device communicates with the electronic device, and the capture device 12 may be a vehicle-mounted camera or other device having a shooting function (e.g., a dashcam, etc.). The plurality of real scene images refers to images obtained by using the capture device 12 to shoot real scenes, wherein each of the real scenes can contain a plurality of real objects, such as buildings, trees and vehicles.

In at least one embodiment, the electronic device obtains the plurality of real scene images by controlling the capture device to capture the real scenes.

In other embodiments, the electronic device can also obtain the plurality of real scene images from a preset database, in which a large number of real scene images are stored. Time stamp information of each of the plurality of real scene images and movement information of the capture device when the capture device captures each real scene image are also stored in the preset database. The preset database can be a BDD100K dataset, which can be set according to requirements of users.

The movement information of the capture device when the capture device captures each real scene image includes, but not limited to, a position of the capture device, an attitude of the capture device, and an acceleration of the capture device, etc. The position of the capture device can be obtained by using a navigation system, and the attitude of the capture device and the acceleration of the capture device can be obtained by at least one sensor of the vehicle. For example, the navigation system can be a global navigation satellite system (GNSS), and the at least one sensor can be an inertial measurement unit (IMU).

S12, the electronic device identifies a plurality of real objects in each of the plurality of real scene images and identifies information (hereinafter referred to "object prediction information") of each of the plurality of real objects in each of the plurality of real scene images using a preset virtual scene generation network.

In at least one embodiment, the preset virtual scene generation network may be a VGG16 network, an Alexnet network, a Letnet5 network, or a Resnet network, etc. The object prediction information of each real object in each real scene image can include, but not limited to, a category (hereinafter referred to as "object category") of each real object, a moving speed and a moving acceleration of each real object, a position (hereinafter referred to as "object position") and a shape (hereinafter referred to as "object shape") of each real object in the corresponding real scene image, etc.

Figure 2:
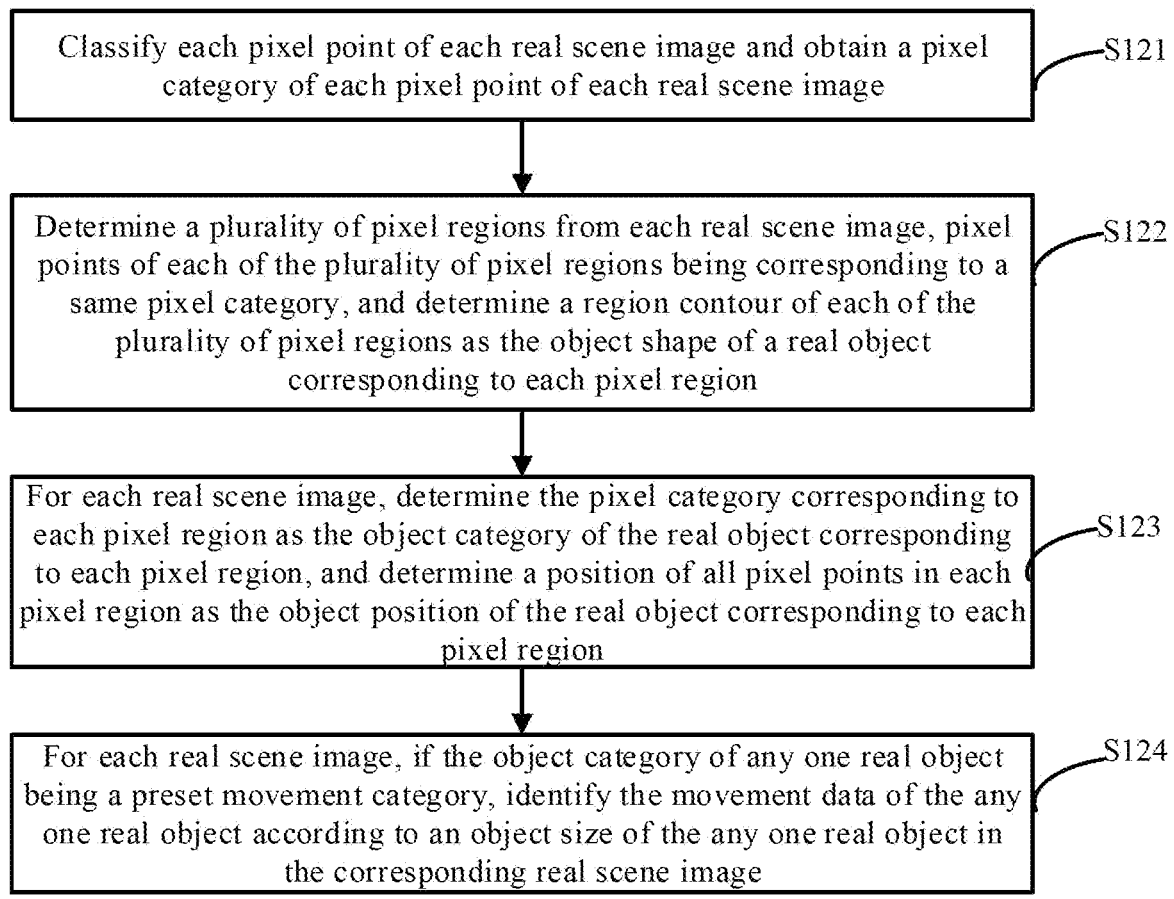
FIG. 2 is a flow chart of a method of identifying object prediction information provided by one embodiment of this application.

A process of identifying the object prediction information of each real object can refer to a process shown in FIG. 2. FIG. 2 is a flow chart of a method of identifying the object prediction information of each real object provided by an embodiment of this application.

S121, the electronic device classifies each pixel point of each real scene image and obtains a category (hereinafter referred to as "pixel category") of each pixel point of each real scene image.

In this embodiment, the electronic device may classify each pixel point using a classifier based on preset pixel categories, the classifier may be a softmax classifier. The preset pixel categories can include, but are not limited to, a category of tree, a category of vehicle, a category of building, and a category of pedestrian. It is understood that a number of the preset pixel categories should be as large as possible to ensure that each pixel point in the plurality of real scene images has a corresponding category.

In this embodiment, the electronic device classifies each pixel point of each real scene image and can accurately determine the pixel category of each pixel point, so as to accurately identify the position and the shape of each real object in each real scene image.

S122, the electronic device determines a plurality of pixel regions from each real scene image, pixel points of each of the plurality of pixel regions corresponds to a same pixel category, and the electronic device determines a contour (hereinafter referred to as "region contour") of each of the plurality of pixel regions as the object shape of the real object corresponding to each pixel region.

In this embodiment, the electronic device determines the object shape of the real object so that a corresponding virtual object can be generated more accurately.

S123, for each real scene image, the electronic device determines the pixel category corresponding to each pixel region as the object category of the real object corresponding to each pixel region, and determines a position of all pixel points in each pixel region as the object position of the real object corresponding to each pixel region.

In this embodiment, the electronic device determines the object position of each real object and thus the electronic device is able to determine the position of a generated virtual object in a first virtual image.

S124, for each real scene image, if the object category of any one real object belongs to a preset category (hereinafter referred to "preset movement category"), the electronic device identifies movement data of the any one real object according to a size (hereinafter referred to as "object size") of the any one real object in the corresponding real scene image.

In this embodiment, the electronic device can identify moving objects from each real scene image by comparing the object category and the preset category of each real object. In this embodiment, the preset movement category can be a category of cat, a category of dog, a category of vehicle, etc.

In this embodiment, the movement data includes a moving speed, a moving acceleration, etc. The electronic device recognizes the movement data of the any one real object according to the object size of the any one real object in the corresponding real scene image, according to following processes.

The processes includes that the electronic device obtains a real size of the any one real object according to the object category of the any one real object; for each two adjacent real scene images of the plurality of real scene images, the electronic device obtains a first time interval between the any two adjacent real scene images and obtains the object size of the any one real object in each of the any two adjacent real scene images such that two object sizes of the any one real object in each two adjacent real scene images are obtained; for each two adjacent real scene images, the electronic device calculates a moving speed of the any one real object according to the real size, the first time interval, the two object sizes, and a focal length of the capture device that captures each two adjacent real scene images, such that for the plurality of real scene images, there is a plurality of moving speeds of the any one real object can be obtained. The electronic device calculates a moving acceleration of the any one real object according to each two adjacent moving speeds of the plurality of moving speeds and a second time interval between each two adjacent moving speeds, such that a plurality of moving accelerations of the any one real object is obtained.

The two adjacent real scene images include two real scene images of which capturing time are adjacent to each other. The two adjacent moving speeds include two moving speeds of which generation time are adjacent to each other. The generation time can also mean a time of obtaining or calculating the moving speed.

The real size of the any one real object corresponds to the object size of the any one real object, and the real size of the any one real object may be a height of the any one real object, a width of the any one real object, or the width*height of the any one real object, etc. For example, if the any one real object is a bicycle, the real size can be a height of the bicycle, a width of the bicycle, or the height*width of the bicycle, etc.

Specifically, the electronic device calculates the moving speed of the any one real object according to the real size, the first time interval, the two object sizes, and the focal length of the capture device that captures each two adjacent real scene images according to following processes:

The electronic device calculates a product of the real size of the any one real object and the focal length; calculates a first ratio of the product to the focal length; obtains two second ratios by dividing each of the two object sizes by the first ratio; calculates a difference between the two second ratios; determines a ratio between the difference and the first time interval as the moving speed of the any one real object.

Specifically, a formula for calculating the moving acceleration is:

$$a = \frac{2(V_1 - V_2)}{t^2};$$

Where, a represents the moving acceleration, $V_1$ represents a first moving speed of two adjacent moving speeds, $V_2$ represents a second moving speed of two adjacent moving speeds, a generation time of the second moving speed is later than a generation time of the first moving speed, and t represents the second time interval.

In this embodiment, if the object category of the any one real object belongs the preset movement category, the movement data of the any one real object can be identified to facilitate more accurate generation of the corresponding virtual object in the following text.

S13, the electronic device generates a first virtual image corresponding to each real scene image using a preset virtual scene simulator according to the object prediction information of each of the plurality of real objects in each of the plurality of real scene images.

In at least one embodiment, the first virtual image refers to an image simulated by the preset virtual scene simulator based on the object prediction information. The preset virtual scene simulator may be a game engine, such as Unreal Engine.

In at least one embodiment, the electronic device generates the first virtual image corresponding to each real scene image using the preset virtual scene simulator according to the object prediction information according to following processes:

The electronic device obtains time stamp information of each real scene image, obtains movement information of the capture device when the capture device captures each real scene image and obtains an internal parameter matrix of the capture device, and then the electronic device obtains the first virtual image corresponding to each real scene image by inputting the internal parameter matrix, the movement information of the capture device when the capture device captures each real scene image, and the object prediction information of each of the plurality of real objects in each real scene image into the preset virtual scene simulator.

Specifically, the electronic device obtains the first virtual image corresponding to each real scene image according to following process:

The electronic device simulates a virtual capture device corresponding to the capture device by inputting the internal reference matrix of the capture device, the time stamp information of each real scene image, the position and the attitude of the capture device when the capture device captures each real scene image into the preset virtual scene simulator, and then the electronic device simulates a plurality of virtual objects corresponding to each real scene image using the preset virtual scene simulator according to the object prediction information of each of the plurality of real objects in each real scene image. The electronic device obtains the first virtual image corresponding to each real scene image by controlling the virtual capture device to capture an initial virtual scene composed of the plurality of virtual objects corresponding to each real scene image.

In one embodiment, the object prediction information of each of the plurality of real objects in each real scene image is three-dimensional information.

In this embodiment, because the object prediction information of each of the plurality of real objects in each real scene image is three-dimensional information, and the object prediction information of each of the plurality of real objects in each real scene image includes the object category, moving speed, moving acceleration, object position and object shape of the real object in the corresponding real scene image, it can make the plurality of virtual objects more accurate.

S14, the electronic device generates a second virtual image and a texture difference image corresponding to each real scene image by inputting each real scene image into a preset virtual image generation network.

In at least one embodiment, the second virtual image corresponding to each real scene image refers to an image generated according to each real scene image and the first virtual image corresponding to each real scene image. A style of the second virtual image corresponding to each real scene image is basically the same as that of the first virtual image corresponding to each real scene image. The texture difference image corresponding to each real scene image refers to an image generated by reconstructing each real scene image. Therefore, the style of the texture difference image is basically the same as that of each scene image.

In at least one embodiment, the preset virtual image generation network includes two feature extraction layers and a reconstruction layer. The electronic device generates the second virtual image and the texture difference image corresponding to each real scene image according to following processes:

The electronic device extracts a first feature vector from each real scene image using one of the two feature extraction layers, and extracts a second feature vector from each real scene image using another one of the two feature extraction layers; then the electronic device obtains the second virtual image by restoring the first feature vector using the reconstruction layer, and obtains the texture difference image by restoring the second feature vector using the reconstruction layer. The first feature vector can be different from the second feature vector. For example, the first feature vector refers to color features, shape features, and spatial relationship features, and the second feature vector refers to textural features.

The virtual image generation network can be at least one of following networks: VGG16 network, Alexnet network, Letnet5 network, Resnet network, etc. Each of the two feature extraction layer includes a convolutional layer, a batch standardization layer, and a pooling layer, etc. The reconstruction layer includes a deconvolution layer, a batch standardization layer, etc. The reconstruction layer and the feature extraction layers have mutually inverse structures.

S15, the electronic device generates a target image corresponding to each real scene image according to the second virtual image and the texture difference image corresponding to each real scene image.

In at least one embodiment, the electronic device generates the target image corresponding to each real scene image according to following processes:

The electronic device obtains the target image by adding a pixel value of each pixel point in the second virtual image to a pixel value of a corresponding pixel point in the texture difference image.

The pixel point in the second virtual image and the corresponding pixel point in texture difference image have the same coordinates.

In other embodiments of this application, the electronic device obtains the target image by performing other operations between the pixel value of each pixel point in each second virtual image and the pixel value of the corresponding pixel point in the texture difference image. For example, the other operations may be multiplication, division or subtraction, etc.

S16, the electronic device generates a virtual scene generation model corresponding to the preset virtual scene generation network according to the plurality of real scene images, the first virtual image, the second virtual image, and the target image corresponding to each real scene image, the preset virtual scene generation network, and the preset virtual image generation network.

In at least one embodiment, the electronic device generates the virtual scene generation model according to following processes:

For each real scene image, the electronic device calculates a first similarity value between each real scene image and the corresponding target image, and calculates a second similarity value between each second virtual image and the corresponding first virtual image, then the electronic device calculates a first loss value by adding the first similarity value to the second similarity value, such that for the plurality of real scene images, the electronic device obtains a plurality of first loss values; the electronic device can obtain a total loss value by calculating a sum of the plurality of first loss values, and then the electronic device obtains the virtual scene generation model by adjusting the preset virtual scene generation network and the preset virtual image generation network according to the total loss value.

Each of the first similarity value and the second similarity value can be a structural similarity index (SSIM).

Specifically, the electronic device obtains the virtual scene generation model by adjusting the preset virtual scene generation network and the preset virtual image generation network according to the total loss value as follows:

The electronic device takes the total loss value as a loss value of the preset virtual scene generation network, and takes the total loss value as a loss value of the preset virtual image generation network; adjusts the preset virtual scene generation network and the preset virtual scene generation network according to the total loss value. When the adjusting of the preset virtual scene generation network and the adjusting of the virtual scene generation network are end, the electronic device takes the adjusted virtual scene generation network as the virtual scene generation model corresponding to the preset virtual scene generation network The electronic device adjusts the virtual scene generation network by adjusting parameters of the virtual scene generation network according to the total loss value; calculates a current loss value of the virtual scene generation network and obtains a current calculated loss value; obtains a current difference value between the current calculated loss value and a previous calculated loss value; and ends the adjusting of the virtual scene generation network until the current difference value is less than or equal to a preset value. Generally, the parameters of the virtual scene generation network that are adjusted can include, but are not limited to, weights and biases.

The process of adjusting the virtual image generation network is similar to the process of adjusting the virtual scene generation network. So it is not repeated here.

In other embodiments of this application, the electronic device can also calculate a first mean square error value of each real scene image and the corresponding target image, and calculates a second mean square error value of each second virtual image and the corresponding first virtual image, and calculates a sum (hereinafter referred to as "mean square error sum") of the first mean square error value and the second mean square error value; and takes the mean square error sum as a loss value of the virtual scene generation network; and adjusts the preset virtual scene generation network according to the mean square error sum.

S17, the electronic device obtains an image to be mapped (hereinafter referred to as "mapping image"), and obtains a target virtual scene corresponding to the mapping image using the virtual scene generation model and the preset virtual scene simulator.

In at least one embodiment, the mapping image can be an image being basically same as any one of the plurality of real scene images, and a method of generating the target virtual scene is basically the same as that of the initial virtual scene, so it is no longer described.

For example, the electronic device can input the mapping image into the virtual scene generation model and obtains object prediction information of each of a plurality of objects in the mapping image; then the electronic device simulates a target virtual capture device corresponding to the capture device by inputting the internal reference matrix of the capture device, the time stamp information of the mapping image, the position and the attitude of the capture device when the capture device captures the mapping image into the preset virtual scene simulator, and then the electronic device simulates a plurality of virtual objects corresponding to the mapping image using the preset virtual scene simulator according to the object prediction information of each of the plurality of real objects in the mapping image; and determines a scene composed of the plurality of virtual objects as the target virtual scene corresponding to the mapping image.

According to the above technical scheme, this application obtains the prediction information of the object through the virtual scene generation network. Since the prediction information of the object includes overall characteristics of the shape and position of the real object in the real scene image, more accurate virtual objects can be generated according to the prediction information of the object. Thus, the first virtual image is more accurate and the second virtual image is similar to the first virtual image. Because the target image integrates characteristics of the second virtual image corresponding to each real scene image and the texture difference image, the second target image can be similar to the corresponding real scene image. The electronic device calculates the first similarity value between each real scene image and the corresponding target image, and calculates the second similarity value between each second virtual image and the corresponding first virtual image, and takes the sum of the first similarity value and the second similarity value as the loss value to adjust the virtual image generation network and the virtual scene generation network, such that the electronic device can improve a precision and an accuracy of the virtual scene model, and then makes the virtual scene generated by the virtual scene generation model more accurate.

Figure 3:
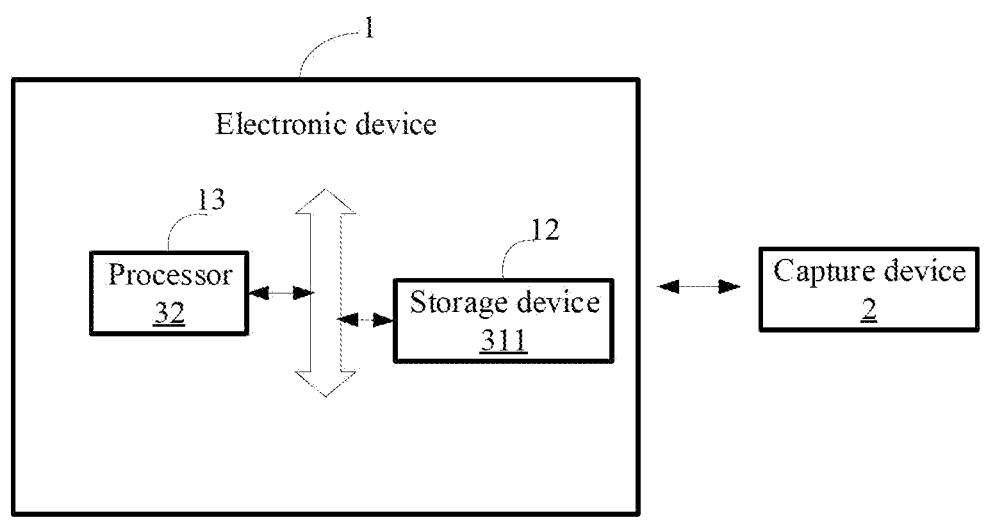
FIG. 3 is a schematic diagram of an electronic device provided by an embodiment of this application.

As shown in FIG. 3, it is a structural diagram of an electronic device according to one embodiment of the present disclosure.

In an embodiment of the present disclosure, the electronic device 1 includes, but is not limited to, a storage device 12, a processor 13, and a computer program stored in the storage device 12 and can be executed by the processor 13. For example, the computer program can be a program of generating the virtual scene.

Those skilled in the art can understand that the schematic structural diagram is only an example of the electronic device 1, and does not constitute a limitation on the electronic device 1, and may include more or less components than the one shown, or combine some components, or different components, for example, the electronic device 1 may also include input and output devices, network access devices, buses, and the like.

The processor 13 may be a central processing unit (CPU), or other general-purpose processors, a digital signal processor (DSP), an application specific integrated circuit (ASIC), Field-Programmable Gate Array (FPGA) or other programmable logic devices, discrete gate or transistor logic devices, discrete hardware components, etc. The general-purpose processor can be a microprocessor or the processor can also be any conventional processor, etc. The processor 13 is the computing core and control center of the electronic device 1, and uses various interfaces and lines to connect each part of the electronic device 1.

The processor 13 obtains the operating system of the electronic device 1 and obtains various installed applications. The processor 13 obtains the application program to implement each block in the embodiments of the foregoing multi-scale autoencoder generation method, for example, to implement each block shown in FIG. 1 and FIG. 2.

Exemplarily, the computer program can be divided into one or more modules/units, and the one or more modules/units are stored in the storage device 12 and retrieved by the processor 13 to complete the present disclosure. The one or more modules/units may be a series of computer program instruction segments capable of performing specific functions, and the instruction segments are used to describe the process of acquisition the computer program in the electronic device 1.

The storage device 12 can be used to store the computer programs and/or modules, and the processor 13 executes or obtains the computer programs and/or modules stored in the storage device 12, and calls up the data stored in the storage device 12, such that various functions of the electronic device 1 are realized. The storage device 12 may mainly include an area for storing programs and an area for storing data, wherein the area for storing programs may store an operating system, an application program required for at least one function (such as a sound playback function, an image playback function, etc.), and the like; the area for storing data may store the data created according to the use of the electronic device 1. In addition, the storage device 12 may include non-volatile storage device such as hard disk, internal memory, plug-in hard disk, smart media card (SMC), Secure digital (SD) card, flash card, at least one disk storage device, flash memory device, or other non-volatile solid state storage device.

The storage device 12 may be an external storage device and/or an internal storage device of the electronic device 1. Further, the storage device 12 may be a storage in physical form, such as a memory stick, a trans-flash card, and the like.

If the modules/units integrated in the electronic device 1 are implemented in the form of software functional units and sold or used as independent products, they may be stored in a computer-readable storage medium. Based on this understanding, the present disclosure can implement all or part of the processes in the methods of the above embodiments, and can also be completed by instructing the relevant hardware through a computer program. The computer program can be stored in a computer-readable storage medium, and when the computer program is acquired by the processor, the blocks of the foregoing method embodiments can be implemented.

Wherein, the computer program includes computer program code, and the computer program code may be in the form of source code, object code, obtainable file or some intermediate form, and the like. The computer-readable medium may include: any entity or device capable of carrying the computer program code, recording medium, U disk, removable hard disk, magnetic disk, optical disk, computer memory, read-only memory (ROM).

With reference to FIG. 1, the storage device 12 in the electronic device 1 stores a plurality of instructions to implement the virtual scene generation method, and the processor 13 can: obtain a plurality of real scene images; identify a plurality of real objects in each of the plurality of real scene images and identify object prediction information of each of the plurality of real objects in each of the plurality of real scene images using a preset virtual scene generation network; generate a first virtual image corresponding to each real scene image using a preset virtual scene simulator according to the object prediction information of each real object in each real scene image; generate a second virtual image and a texture difference image corresponding to each real scene image by inputting each real scene image into a preset virtual image generation network; generate a target image corresponding to each real scene image according to the second virtual image and the texture difference image corresponding to each real scene image; generate a virtual scene generation model corresponding to the preset virtual scene generation network according to the plurality of real scene images, the first virtual image, the second virtual image, and the target image corresponding to each real scene image, and the preset virtual scene generation network; and obtain a target virtual scene corresponding to a mapping image using the virtual scene generation model and the preset virtual scene simulator.

Specifically, for the specific implementation method of the above-mentioned instruction by the processor 13, reference may be made to the description of the relevant blocks in the corresponding embodiment of FIG. 1, and details are not repeated.

In the several embodiments provided in this disclosure, it should be understood that the devices and methods disclosed can be implemented by other means. For example, the device embodiments described above are only schematic. For example, the division of the modules is only a logical function division, which can be implemented in another way.

The modules described as separate parts may or may not be physically separate, and the parts displayed as modules may or may not be physical units, that is, may be located in one place, or may be distributed over multiple network units. Part or all of the modules can be selected according to the actual needs to achieve the purpose of this embodiment.

In addition, each functional unit in each embodiment of the present disclosure can be integrated into one processing unit, or can be physically present separately in each unit, or two or more units can be integrated into one unit. The above integrated unit can be implemented in a form of hardware or in a form of a software functional unit.

The above integrated modules implemented in the form of function modules may be stored in a storage medium. The above function modules may be stored in a storage medium, and include several instructions to enable a computing device (which may be a personal computer, server, or network device, etc.) or processor to execute the method described in the embodiment of the present disclosure.

The present disclosure is not limited to the details of the above-described exemplary embodiments, and the present disclosure can be embodied in other specific forms without departing from the spirit or essential characteristics of the present disclosure. Therefore, the present embodiments are to be considered as illustrative and not restrictive, and the scope of the present disclosure is defined by the appended claims. All changes and variations in the meaning and scope of equivalent elements are included in the present disclosure. Any reference sign in the claims should not be construed as limiting the claim. Furthermore, the word "comprising" does not exclude other units nor does the singular exclude the plural. A plurality of units or devices stated in the system claims may also be implemented by one unit or device through software or hardware. Words such as "first" and "second" are used to indicate names but not to signify any particular order.

The above description is only embodiments of the present disclosure and is not intended to limit the present disclosure, and various modifications and changes can be made to the present disclosure. Any modifications, equivalent substitutions, improvements, etc. made within the spirit and scope of the present disclosure are intended to be included within the scope of the present disclosure.

What is claimed is:

1. A virtual scene generation method applied to an electronic device, the method comprising:
   obtaining a plurality of real scene images;
   identifying a plurality of real objects in each of the plurality of real scene images and identifying object prediction information of each of the plurality of real objects in each of the plurality of real scene images using a preset virtual scene generation network;
   generating a first virtual image corresponding to each real scene image using a preset virtual scene simulator according to the object prediction information of each real object in each real scene image;
   generating a second virtual image and a texture difference image corresponding to each real scene image by inputting each real scene image into a preset virtual image generation network;
   generating a target image corresponding to each real scene image according to the second virtual image and the texture difference image corresponding to each real scene image;
   generating a virtual scene generation model corresponding to the preset virtual scene generation network according to the plurality of real scene images, the first virtual image, the second virtual image, the target image corresponding to each real scene image, and the preset virtual scene generation network; and
   obtaining a target virtual scene corresponding to a mapping image using the virtual scene generation model and the preset virtual scene simulator;
   wherein the generating of the virtual scene generation model comprises:
   calculating a first similarity value between each real scene image and the corresponding target image, and calculating a second similarity value between each second virtual image and the corresponding first virtual image, wherein each of the first similarity value and the second similarity value is a structural similarity index (SSIM);
   calculating a first loss value by adding the first similarity value to the second similarity value, such that for the plurality of real scene images, a plurality of first loss values is obtained;
   obtaining a total loss value by calculating a sum of the plurality of first loss values; and
   obtaining the virtual scene generation model by adjusting the preset virtual scene generation network according to the total loss value.

2. The virtual scene generation method according to claim 1, wherein the object prediction information of each of the plurality of real objects in each of the plurality of real scene images comprises an object category of each real object, movement data of each real object, an object position and an object shape of each real object in a corresponding real scene image, wherein the identifying of the object prediction information of each of the plurality of real objects in each of the plurality of real scene images comprises:
   classifying each pixel point of each real scene image and obtaining a pixel category of each pixel point of each real scene image;
   determining a plurality of pixel regions from each real scene image, pixel points of each of the plurality of pixel regions being corresponding to a same pixel category, and determining a region contour of each of the plurality of pixel regions as the object shape of a real object corresponding to each pixel region;
   determining the pixel category corresponding to each pixel region as the object category of the real object corresponding to each pixel region, and determining a position of all pixel points in each pixel region as the object position of the real object corresponding to each pixel region for each real scene image;
   identifying the movement data of any one real object according to an object size of the any one real object in the corresponding real scene image for each real scene image, if the object category of the any one real object being a preset movement category.

3. The virtual scene generation method according to claim 1, wherein the generating of the first virtual image corresponding to each real scene image comprises:
   obtaining time stamp information of each real scene image, obtaining movement information of a capture device when the capture device captures each real scene image, and obtaining an internal parameter matrix of the capture device; and
   obtaining the first virtual image corresponding to each real scene image by inputting the internal parameter matrix, the movement information of the capture device when the capture device captures each real scene image, and the object prediction information of each of the plurality of real objects in each real scene image into the preset virtual scene simulator.

4. The virtual scene generation method according to claim 3, wherein the movement information of the capture device when the capture device captures each real scene image comprises a position of the capture device, and an attitude of the capture device when the capture device captures each real scene image; wherein the obtaining of the first virtual image corresponding to each real scene image comprises:
   simulating a virtual capture device corresponding to the capture device by inputting the internal reference matrix of the capture device, the time stamp information of each real scene image, the position and the attitude of the capture device when the capture device captures each real scene image into the preset virtual scene simulator;
   simulating a plurality of virtual objects corresponding to each real scene image using the preset virtual scene simulator according to the object prediction information of each of the plurality of real objects in each real scene image; and
   obtaining the first virtual image corresponding to each real scene image by controlling the virtual capture device to capture an initial virtual scene composed of the plurality of virtual objects corresponding to each real scene image.

5. The virtual scene generation method according to claim 1, wherein the preset virtual image generation network comprises two feature extraction layers and a reconstruction layer; the generating of the second virtual image and the texture difference image corresponding to each real scene image comprises:
 extracting a first feature vector from each real scene image using one of the two feature extraction layers, and extracting a second feature vector from each real scene image using another one of the two feature extraction layers;
 obtaining the second virtual image by restoring the first feature vector using the reconstruction layer, and obtaining the texture difference image by restoring the second feature vector using the reconstruction layer.

6. The virtual scene generation method according to claim 1, wherein the generating of the target image corresponding to each real scene image according to the second virtual image and the texture difference image corresponding to each real scene image comprises:
 obtaining the target image by adding a pixel value of each pixel point in the second virtual image to a pixel value of a corresponding pixel point in the texture difference image.

7. The virtual scene generation method according to claim 1,
 wherein the object prediction information of each of the plurality of real objects in each of the plurality of real scene images comprises an object category of each real object, movement data of each real object, an object position and an object shape of each real object in a corresponding real scene image, wherein the identifying of the object prediction information of each of the plurality of real objects in each of the plurality of real scene images comprises:
 classifying each pixel point of each real scene image and obtaining a pixel category of each pixel point of each real scene image;
 determining a plurality of pixel regions from each real scene image, pixel points of each of the plurality of pixel regions being corresponding to a same pixel category, and determining a region contour of each of the plurality of pixel regions as the object shape of a real object corresponding to each pixel region;
 determining the pixel category corresponding to each pixel region as the object category of the real object corresponding to each pixel region, and determining a position of all pixel points in each pixel region as the object position of the real object corresponding to each pixel region for each real scene image;
 identifying the movement data of any one real object according to an object size of the any one real object in the corresponding real scene image for each real scene image, if the object category of the any one real object being a preset movement category;
 wherein the movement data comprises a moving speed, and a moving acceleration, and the identifying of the movement data of any one real object according to the object size of the any one real object in the corresponding real scene image for each real scene image comprises:
 obtaining a real size of the any one real object according to the object category of the any one real object;
 for each two adjacent real scene images of the plurality of real scene images, obtaining a first time interval between the two adjacent real scene images and obtaining the object size of the any one real object in each of the two adjacent real scene images such that two object sizes of the any one real object in each two adjacent real scene images are obtained;
 for each two adjacent real scene images, calculating a moving speed of the any one real object according to the real size, the first time interval, the two object sizes, and a focal length of a capture device that captures each two adjacent real scene images, such that for the plurality of real scene images, there is a plurality of moving speeds of the any one real object are obtained;
 calculating a moving acceleration of the any one real object according to each two adjacent moving speeds of the plurality of moving speeds and a second time interval between each two adjacent moving speeds, such that a plurality of moving accelerations of the any one real object is obtained.

8. The virtual scene generation method according to claim 1, wherein the obtaining of the virtual scene generation model by adjusting the preset virtual scene generation network according to the total loss value comprises:
 taking the total loss value as a loss value of the preset virtual scene generation network; and taking the total loss value as a loss value of the preset virtual image generation network;
 adjusting the preset virtual scene generation network and the preset virtual image generation network according to the total loss value;
 taking the adjusted virtual scene generation network as the virtual scene generation model corresponding to the preset virtual scene generation network, in response that the adjusting of the preset virtual scene generation network and the adjusting of the virtual scene generation network are end.

9. An electronic device comprising:
 a storage device;
 at least one processor; and
 the storage device storing one or more programs, which when executed by the at least one processor, cause the at least one processor to:
 obtain a plurality of real scene images;
 identify a plurality of real objects in each of the plurality of real scene images and identify object prediction information of each of the plurality of real objects in each of the plurality of real scene images using a preset virtual scene generation network;
 generate a first virtual image corresponding to each real scene image using a preset virtual scene simulator according to the object prediction information of each real object in each real scene image;
 generate a second virtual image and a texture difference image corresponding to each real scene image by inputting each real scene image into a preset virtual image generation network;
 generate a target image corresponding to each real scene image according to the second virtual image and the texture difference image corresponding to each real scene image;
 generate a virtual scene generation model corresponding to the preset virtual scene generation network according to the plurality of real scene images, the first virtual image, the second virtual image, the target image corresponding to each real scene image, and the preset virtual scene generation network; and
 obtain a target virtual scene corresponding to a mapping image using the virtual scene generation model and the preset virtual scene simulator;

wherein the generating of the virtual scene generation model comprises:
  calculating a first similarity value between each real scene image and the corresponding target image, and calculating a second similarity value between each second virtual image and the corresponding first virtual image, wherein each of the first similarity value and the second similarity value is a structural similarity index (SSIM);
  calculating a first loss value by adding the first similarity value to the second similarity value, such that for the plurality of real scene images, a plurality of first loss values is obtained;
  obtaining a total loss value by calculating a sum of the plurality of first loss values; and
  obtaining the virtual scene generation model by adjusting the preset virtual scene generation network according to the total loss value.

10. The electronic device according to claim 9, wherein the object prediction information of each of the plurality of real objects in each of the plurality of real scene images comprises an object category of each real object, movement data of each real object, an object position and an object shape of each real object in a corresponding real scene image, wherein the at least one processor identifies the object prediction information of each of the plurality of real objects in each of the plurality of real scene images by:
  classifying each pixel point of each real scene image and obtaining a pixel category of each pixel point of each real scene image;
  determining a plurality of pixel regions from each real scene image, pixel points of each of the plurality of pixel regions being corresponding to a same pixel category, and determining a region contour of each of the plurality of pixel regions as the object shape of a real object corresponding to each pixel region;
  determining the pixel category corresponding to each pixel region as the object category of the real object corresponding to each pixel region, and determining a position of all pixel points in each pixel region as the object position of the real object corresponding to each pixel region for each real scene image;
  identifying the movement data of any one real object according to an object size of the any one real object in the corresponding real scene image for each real scene image, if the object category of the any one real object being a preset movement category.

11. The electronic device according to claim 9, wherein the at least one processor generates the first virtual image corresponding to each real scene image by:
  obtaining time stamp information of each real scene image, obtaining movement information of a capture device when the capture device captures each real scene image, and obtaining an internal parameter matrix of the capture device; and
  obtaining the first virtual image corresponding to each real scene image by inputting the internal parameter matrix, the movement information of the capture device when the capture device captures each real scene image, and the object prediction information of each of the plurality of real objects in each real scene image into the preset virtual scene simulator.

12. The electronic device according to claim 11, wherein the movement information of the capture device when the capture device captures each real scene image comprises a position of the capture device, and an attitude of the capture device when the capture device captures each real scene image; wherein the at least one processor obtains the first virtual image corresponding to each real scene image by:
  simulating a virtual capture device corresponding to the capture device by inputting the internal reference matrix of the capture device, the time stamp information of each real scene image, the position and the attitude of the capture device when the capture device captures each real scene image into the preset virtual scene simulator;
  simulating a plurality of virtual objects corresponding to each real scene image using the preset virtual scene simulator according to the object prediction information of each of the plurality of real objects in each real scene image; and
  obtaining the first virtual image corresponding to each real scene image by controlling the virtual capture device to capture an initial virtual scene composed of the plurality of virtual objects corresponding to each real scene image.

13. The electronic device according to claim 9, wherein the preset virtual image generation network comprises two feature extraction layers and a reconstruction layer; the at least one processor generates the second virtual image and the texture difference image corresponding to each real scene image by:
  extracting a first feature vector from each real scene image using one of the two feature extraction layers, and extracting a second feature vector from each real scene image using another one of the two feature extraction layers;
  obtaining the second virtual image by restoring the first feature vector using the reconstruction layer, and obtaining the texture difference image by restoring the second feature vector using the reconstruction layer.

14. The electronic device according to claim 9, wherein the at least one processor generates the target image corresponding to each real scene image according to the second virtual image and the texture difference image corresponding to each real scene image by:
  obtaining the target image by adding a pixel value of each pixel point in the second virtual image to a pixel value of a corresponding pixel point in the texture difference image.

15. The electronic device according to claim 9,
  wherein the object prediction information of each of the plurality of real objects in each of the plurality of real scene images comprises an object category of each real object, movement data of each real object, an object position and an object shape of each real object in a corresponding real scene image, wherein the at least one processor identifies the object prediction information of each of the plurality of real objects in each of the plurality of real scene images by:
  classifying each pixel point of each real scene image and obtaining a pixel category of each pixel point of each real scene image;
  determining a plurality of pixel regions from each real scene image, pixel points of each of the plurality of pixel regions being corresponding to a same pixel category, and determining a region contour of each of the plurality of pixel regions as the object shape of a real object corresponding to each pixel region;
  determining the pixel category corresponding to each pixel region as the object category of the real object corresponding to each pixel region, and determining a position of all pixel points in each pixel region as the object position of the real object corresponding to each pixel region for each real scene image;

identifying the movement data of any one real object according to an object size of the any one real object in the corresponding real scene image for each real scene image, if the object category of the any one real object being a preset movement category;

wherein the movement data comprises a moving speed, and a moving acceleration, and the identifying of the movement data of any one real object according to the object size of the any one real object in the corresponding real scene image for each real scene image comprises:

obtaining a real size of the any one real object according to the object category of the any one real object;

for each two adjacent real scene images of the plurality of real scene images, obtaining a first time interval between the two adjacent real scene images and obtaining the object size of the any one real object in each of the two adjacent real scene images such that two object sizes of the any one real object in each two adjacent real scene images are obtained;

for each two adjacent real scene images, calculating a moving speed of the any one real object according to the real size, the first time interval, the two object sizes, and a focal length of a capture device that captures each two adjacent real scene images, such that for the plurality of real scene images, there is a plurality of moving speeds of the any one real object are obtained;

calculating a moving acceleration of the any one real object according to each two adjacent moving speeds of the plurality of moving speeds and a second time interval between each two adjacent moving speeds, such that a plurality of moving accelerations of the any one real object is obtained.

16. The electronic device according to claim 9, wherein the at least one processor obtains the virtual scene generation model by adjusting the preset virtual scene generation network according to the total loss value by:

taking the total loss value as a loss value of the preset virtual scene generation network; and taking the total loss value as a loss value of the preset virtual image generation network;

adjusting the preset virtual scene generation network and the preset virtual image generation network according to the total loss value;

taking the adjusted virtual scene generation network as the virtual scene generation model corresponding to the preset virtual scene generation network, in response that the adjusting of the preset virtual scene generation network and the adjusting of the virtual scene generation network are end.

17. A non-transitory storage medium having instructions stored thereon, when the instructions are executed by a processor of an electronic device, the processor is caused to perform a virtual scene generation method, wherein the method comprises:

obtaining a plurality of real scene images;

identifying a plurality of real objects in each of the plurality of real scene images and identifying object prediction information of each of the plurality of real objects in each of the plurality of real scene images using a preset virtual scene generation network;

generating a first virtual image corresponding to each real scene image using a preset virtual scene simulator according to the object prediction information of each real object in each real scene image;

generating a second virtual image and a texture difference image corresponding to each real scene image by inputting each real scene image into a preset virtual image generation network;

generating a target image corresponding to each real scene image according to the second virtual image and the texture difference image corresponding to each real scene image;

generating a virtual scene generation model corresponding to the preset virtual scene generation network according to the plurality of real scene images, the first virtual image, the second virtual image, the target image corresponding to each real scene image, and the preset virtual scene generation network; and obtaining a target virtual scene corresponding to a mapping image using the virtual scene generation model and the preset virtual scene simulator;

wherein the generating of the virtual scene generation model comprises:

calculating a first similarity value between each real scene image and the corresponding target image, and calculating a second similarity value between each second virtual image and the corresponding first virtual image, wherein each of the first similarity value and the second similarity value is a structural similarity index (SSIM);

calculating a first loss value by adding the first similarity value to the second similarity value, such that for the plurality of real scene images, a plurality of first loss values is obtained;

obtaining a total loss value by calculating a sum of the plurality of first loss values; and obtaining the virtual scene generation model by adjusting the preset virtual scene generation network according to the total loss value.

18. The non-transitory storage medium according to claim 17, wherein the object prediction information of each of the plurality of real objects in each of the plurality of real scene images comprises an object category of each real object, movement data of each real object, an object position and an object shape of each real object in a corresponding real scene image, wherein the identifying of the object prediction information of each of the plurality of real objects in each of the plurality of real scene images comprises:

classifying each pixel point of each real scene image and obtaining a pixel category of each pixel point of each real scene image;

determining a plurality of pixel regions from each real scene image, pixel points of each of the plurality of pixel regions being corresponding to a same pixel category, and determining a region contour of each of the plurality of pixel regions as the object shape of a real object corresponding to each pixel region;

determining the pixel category corresponding to each pixel region as the object category of the real object corresponding to each pixel region, and determining a position of all pixel points in each pixel region as the object position of the real object corresponding to each pixel region for each real scene image;

identifying the movement data of any one real object according to an object size of the any one real object in the corresponding real scene image for each real scene image, if the object category of the any one real object being a preset movement category.

19. The non-transitory storage medium according to claim 17, wherein the generating of the first virtual image corresponding to each real scene image comprises:

obtaining time stamp information of each real scene image, obtaining movement information of a capture device when the capture device captures each real scene image, and obtaining an internal parameter matrix of the capture device; and obtaining the first virtual image corresponding to each real scene image by inputting the internal parameter matrix, the movement information of the capture device when the capture device captures each real scene image, and the object prediction information of each of the plurality of real objects in each real scene image into the preset virtual scene simulator.

20. The non-transitory storage medium according to claim 19, wherein the movement information of the capture device when the capture device captures each real scene image comprises a position of the capture device, and an attitude of the capture device when the capture device captures each real scene image; wherein the obtaining of the first virtual image corresponding to each real scene image comprises:

simulating a virtual capture device corresponding to the capture device by inputting the internal reference matrix of the capture device, the time stamp information of each real scene image, the position and the attitude of the capture device when the capture device captures each real scene image into the preset virtual scene simulator;

simulating a plurality of virtual objects corresponding to each real scene image using the preset virtual scene simulator according to the object prediction information of each of the plurality of real objects in each real scene image; and obtaining the first virtual image corresponding to each real scene image by controlling the virtual capture device to capture an initial virtual scene composed of the plurality of virtual objects corresponding to each real scene image.

* * * * *